No. 764,945. PATENTED JULY 12, 1904.
J. S. HORTON.
CRATE.
APPLICATION FILED MAR. 31, 1904.
NO MODEL. 2 SHEETS—SHEET 1.
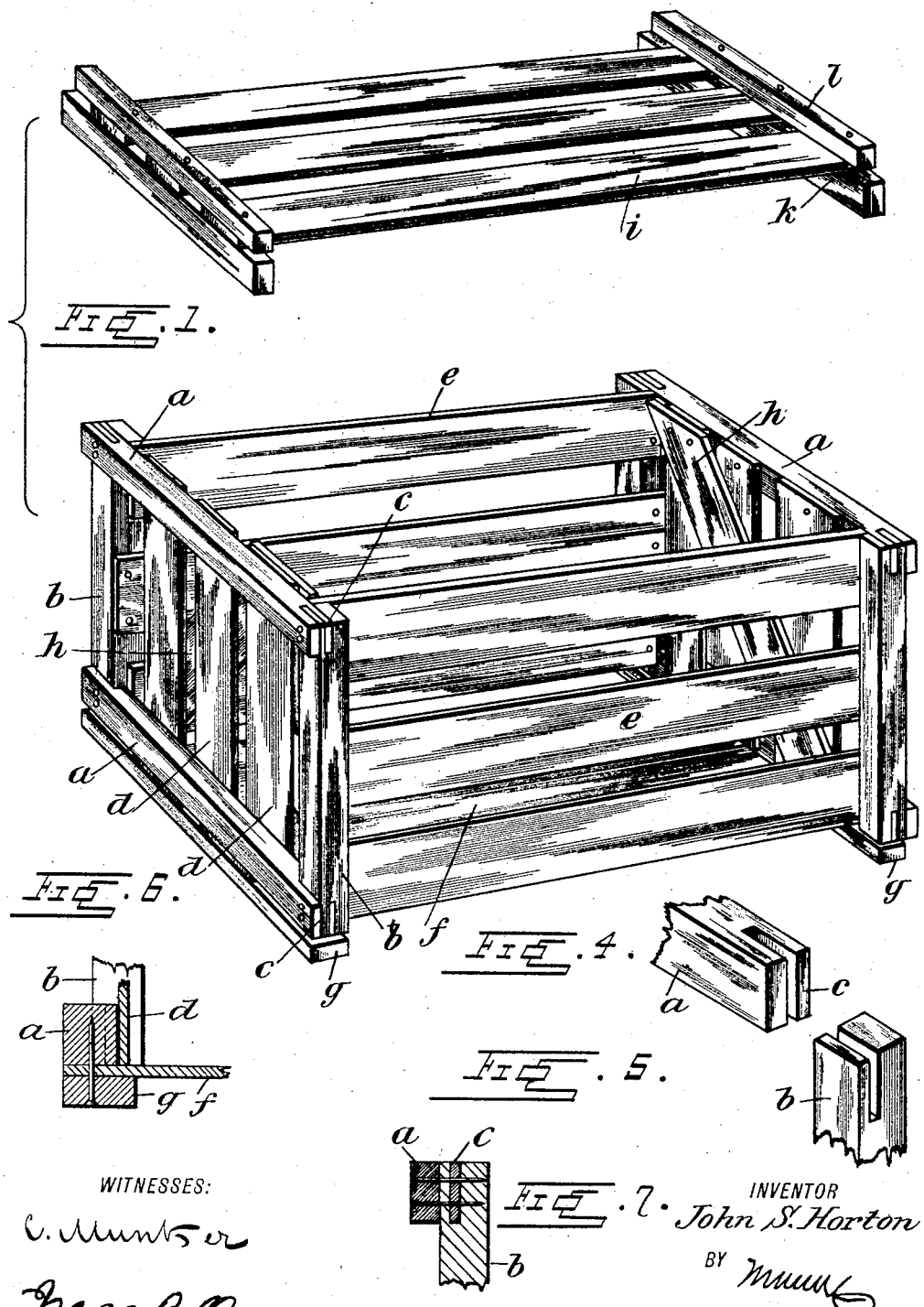

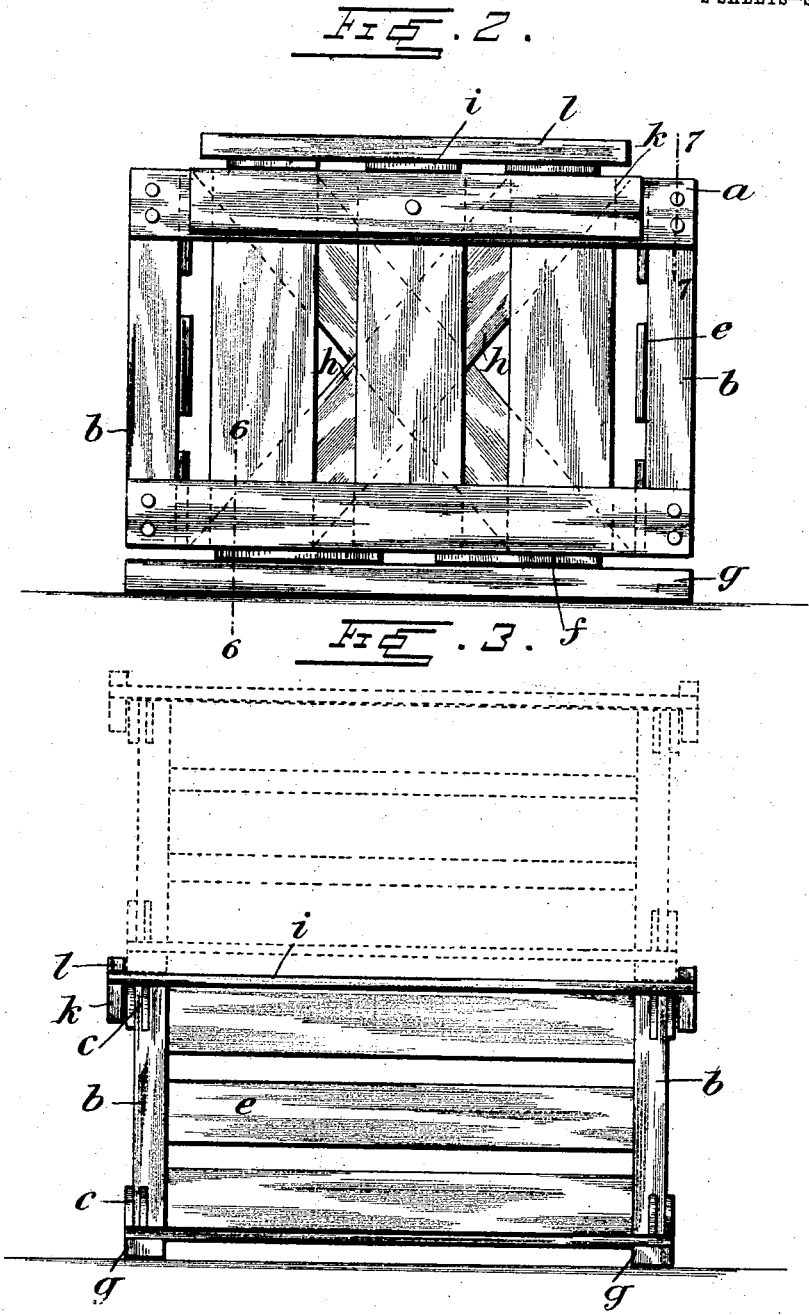

No. 764,945.

Patented July 12, 1904.

UNITED STATES PATENT OFFICE.

JOHN SEYMOUR HORTON, OF LINCOLN, DELAWARE.

CRATE.

SPECIFICATION forming part of Letters Patent No. 764,945, dated July 12, 1904.

Application filed March 31, 1904. Serial No. 200,898. (No model.)

*To all whom it may concern:*

Be it known that I, JOHN SEYMOUR HORTON, a citizen of the United States, and a resident of Lincoln, in the county of Sussex and State of Delaware, have invented a new and Improved Crate, of which the following is a full, clear, and exact description.

This invention relates to a crate intended especially for the transportation of fruit, but useful in various other connections, as will be apparent.

In the transportation of fruit as now generally practiced, and particularly in the transportation of peaches, it has been found necessary to fit up a freight-car with rows of shelves to contain baskets of fruit in such a way as to prevent the fruit from being bruised by the pressure of one package against the other. This practice is expensive to the railroad and to the shipper, and the principal object of my invention is to provide a crate in which fruit may be packed and shipped without involving the above-referred-to expense.

It is also an object of my invention to give the crate sufficient strength to enable the crates to be piled one on the other and to so form the crates as to allow for an unrestrained circulation of air through and between them, thus keeping the fruit in proper condition during the transportation thereof.

To these ends the invention consists in certain peculiar features of construction which will be hereinafter fully set forth.

This specification is an exact description of one form of my invention, while the claims define the precise scope thereof.

Reference is to be had to the accompanying drawings, forming a part of this specification, in which similar characters of reference indicate corresponding parts in all the views.

Figure 1 is a perspective view showing the crate and illustrating the top thereof raised above the body of the crate. Fig. 2 is an end elevation of the crate. Fig. 3 is a side elevation indicating by broken lines the position of the crate above when two crates are superimposed. Figs. 4 and 5 are perspective views showing the manner of joining the parts of the end frame of the crate. Fig. 6 is a detail section on the line 6 6 of Fig. 2, and Fig. 7 is a detail section on the line 7 7 of Fig. 2.

The body of the crate comprises two end frames, each formed of top and bottom bars $a$ and side bars $b$, these bars being joined together in rectangular arrangement by means of a double tenon-and-mortise joint $c$. (Indicated best in Figs. 4, 5, and 7.) Fastened to said frames are the end slats $d$, which may be of any desired form and number. The end frames are connected by longitudinal side and bottom slats $e$ and $f$, the side slats $e$ being fastened to the inner sides of the side members $b$ of the end frames and the bottom slats $f$ being fastened to the under sides of the bottom members of the end frames. Cleats $g$ are fastened to the under sides of the bottom slats $f$ by nails, screws, or other equivalent fastening means, which are passed through the cleats $g$ and bottom slats $f$ upward into the bottom sections $a$ of the end frames. If desired, diagonal braces $h$ may be employed further to strengthen the ends of the crate.

The top of the crate comprises longitudinal slats $i$, and at each end the top is provided with two cross-bars $k$ and $l$, the bars $l$ being arranged on the upper sides of the slats and the bars $k$ on the under sides and the whole being fastened together in any desired manner. The top is adapted to lie over the crate with the slats $i$ resting on the upper cross-bars $a$ of the end frames of the crate-body and with the bars $k$ lying, respectively, outside of the upper bars or sections $a$ of the ends of the crate-body. This is clearly shown in Figs. 2 and 3. Any suitable means may be employed for fastening the top in place, one of the several devices used for this purpose being a wire or other metallic staple fastened to the under sides of the upper bars $a$ of the ends of the crate-body and to the bars $k$ or $l$ of the top.

With respect to this invention it will be seen, particularly by reference to Fig. 3, that the crates may be piled one on the other with great convenience and that when so arranged they will not be liable to slide out of position, owing to the tilting or jostling of the vehicle in which they may be placed. When the crates are so superimposed, the bottom cleats $g$ of the upper crate rest on the end portions of the top slats $i$ inside of the respective bars $l$, and in this manner sliding movement of the upper crate is prevented. Further, it will be seen that by the arrangement of the bottom cleats $g$ and by the peculiar manner of joining the parts $a$ and $b$ of the end frames of the crate-body a free and unrestrained circulation of air is allowed around all sides and through the crates, thus keeping the fruit cool and preserving its proper condition.

Various changes in the form, proportions, and minor details of the invention may be resorted to at will without departing from the spirit of the invention. Hence I consider myself entitled to all such variations thereof as may lie within the scope of the claims.

Having thus described my invention, I claim as new and desire to secure by Letters Patent—

1. A crate, consisting of a body comprising end frames each formed of top, bottom and end bars united by double tenon mortise joints and slats secured to the inner faces of the top and bottom bars, side and bottom slats connecting the said frames, the side slats being secured to the inner faces of the end bars and the bottom slats to the under face of the bottom bars of said frames, and cleats secured to the under side of the bottom slats below the bottom bars of the frames, and a cover formed of longitudinal slats and cross-bars secured on the upper and lower sides of the slats at the ends thereof, the slats resting upon the top bars of the end frames of the body and the bars on the under side of the slats against the outer faces of the top bars of said end frames, substantially as herein shown and described.

2. A crate, consisting of a body formed of end frames having their slats secured to the inner faces of the top and bottom bars and connected by side and bottom slats, the side slats being secured to the inner faces of the end bars of the frames and the bottom slats to the under side of the bottom bars of said frames, cleats being secured to the under side of the bottom slats below the bottom bars of the frames, and a cover formed of longitudinal slats and bars secured upon the upper and lower faces of the slats at the ends thereof, the slats of the cover lying upon the top bars of the end frames of the body and the bars on the under side of the slats against the outer faces of the top bars of said end frames, as set forth.

In testimony whereof I have signed my name to this specification in the presence of two subscribing witnesses.

JOHN SEYMOUR HORTON.

Witnesses:
LAURA TATMAN,
CHARLES G. FISHER.